United States Patent [19]

Horiba et al.

[11] Patent Number: 4,550,067
[45] Date of Patent: Oct. 29, 1985

[54] SECONDARY BATTERY

[75] Inventors: Tatsuo Horiba, Hitachi; Kazunori Fujita; Shinpei Matsuda, both of Toukai; Kohki Tamura, Hitachi, all of Japan

[73] Assignee: Hitachi, Ltd., Tokyo, Japan

[21] Appl. No.: 622,624

[22] Filed: Jun. 20, 1984

Related U.S. Application Data

[63] Continuation-in-part of Ser. No. 458,054, Jan. 14, 1983, abandoned.

[30] Foreign Application Priority Data

Jan. 14, 1982 [JP] Japan .................. 57-4510

[51] Int. Cl.$^4$ ..................... H01M 10/00; H01M 4/60
[52] U.S. Cl. .................................. 429/213; 429/218; 429/199; 429/201
[58] Field of Search ............... 429/213, 212, 218, 220, 429/221, 194, 199, 201, 196

[56] References Cited

U.S. PATENT DOCUMENTS

| | | | |
|---|---|---|---|
| 3,660,163 | 5/1972 | Moser | 429/213 X |
| 3,998,658 | 12/1976 | Dey | 429/218 |
| 4,251,607 | 2/1981 | Yamaki et al. | 429/194 |
| 4,252,875 | 2/1981 | Venkatasetty | 429/196 |
| 4,321,114 | 3/1982 | MacDiarmid et al. | 429/213 X |
| 4,442,187 | 4/1984 | MacDiarmid et al. | 429/213 |

FOREIGN PATENT DOCUMENTS 1216549 12/1970 United Kingdom ............... 429/213

Primary Examiner—Anthony Skapars
Attorney, Agent, or Firm—Antonelli, Terry & Wands

[57] ABSTRACT

The disclosure is concerned with a secondary cell comprising a positive electrode, a negative electrode, a liquidous electrolyte layer interposed between the electrodes, said electrolyte containing a dopant consisting of an anion and a cation, means for electrically insulating the electrodes, and an envelope for enclosing and for air-tightly sealing the electrodes and the electrolyte.

The positive electrode or the negative electrode is made of a material, such as, phthalocyanine complexes, metal porphyrin complexes, chalcogenides of transition metals and an electrically conductive polymeric material such as polyacetylene.

The secondary cell of the present invention has a long service life because of its good durability to charge and discharge operations.

14 Claims, 5 Drawing Figures

4,550,067

SECONDARY BATTERY

This application is a continuation-in-part of application Ser. No. 458,054, filed Jan. 14, 1983, now abandoned.

FIELD OF THE INVENTION

The present invention relates to a secondary cell employing an electrically conductive plastic material for the electrodes.

BACKGROUND OF THE INVENTION

A plastic secondary cell made of electrodes of a plastic material such as polyacetylene which becomes highly electrically conductive when it is doped with ions, and an organic electrolyte containing (n-Bu$_4$N)-ClO$_4$ or LiI as the electrolytic substance, is now drawing attention owing to its advantages such as its large charge/discharge capacity per unit weight, its lack of dendritic deposition while it is being charged, and its light weight. At the moment, however, such a secondary cell having a satisfactory cell performance has not yet been developed and, hence, has not been, put to practical use.

SUMMARY OF THE INVENTION

The present invention was accomplished under such circumstances, and its object is to provide a plastic secondary cell having an excellent cell performance.

One feature of the plastic secondary cell of the present invention resides in that at least one of the positive and the negative electrodes is made of an electrically conductive plastic material, and the cell has a non-oxyacidic electrolytic substance. Another feature is that the secondary cell comprises a positive electrode, a negative electrode, and an organic electrolyte, wherein at least the negative electrode consists of a plastic material which is capable of being converted into a highly electrically conductive material when it is doped with cations, and the electrolytic substance in the organic electrolyte contains non-oxyacidic polyatomic anions.

A secondary cell of the present invention comprises a positive electrode, a negative electrode, a liquidous electrolyte layer interposed between the electrodes, said electrolyte containing a dopant consisting of an anion and a cation, means for electrically insulating the electrodes, and an envelope for enclosing and for airtightly sealing the electrolyte and the electrodes, wherein one of the electrodes is made of a material which is capable of being reversibly converted into a highly conductive substance by doping anions or cations thereinto, the other electrode is made of a material selected from the group consisting of phthalocyanine complexes, metal porphyrin complexes, chalcogenides of transition metals and an electrically conductive polymeric plastic material, said electrolyte further containing a non-oxyacidic substance containing an oxygen-atom free acidic polyatomic anions.

Preferably, the anion contained in the electrolyte is a member selected from the group consisting of BF$_4^-$, AlCl$_4^-$, AsF$_6^-$, PF$_6^-$, SCN$^-$, SbF$_6^-$, NbF$_6^-$ and TaF$_6^-$.

Further, the cation is preferably selected from the group consisting of alkali metal ions, ammonium ions, phosphonium ions and arsonium ions.

Preferably a positive electrode is made of a member selected from the group consisting of metal phthalocyanine complexes, metal porphyrin complexes and transition metal chalcogenide compounds.

Figure 1:
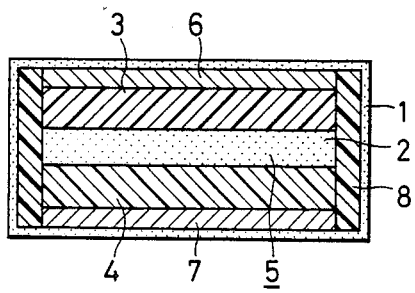
FIG. 1 is a schematic cross-section of a plastic secondary cell according to an embodiment of the present invention.

The inventors of the present invention have conducted extensive studies concerning electrolytic substances, and have discovered defects such that oxyacid ions such as ClO$_4^-$ or halide ions such as I$^-$ tend to readily oxidize a plastic material such as polyacetylene forming the electrodes during the charging period, and cause the cell to self-discharge at an increased rate. The inventors have discovered the fact that it is advantageous to use an electrolytic substance which contains non-oxyacidic anions and, particularly, which contains non-oxyacidic polyatomic anions.

The present invention can also be adapted effectively for cells which employ an electrically conductive plastic material as the negative electrode, and a metal oxide such as manganese dioxide as the positive electrode. In this case, the positive electrode is not damaged by halogen ions since it is not made of an electrically conductive plastic material. Examples of the anions useful for the present invention include BF$_4^-$, AlCl$_4^-$, AsF$_6^-$, PF$_6^-$, SCN$^-$, SbF$_6^-$, NbF$_6^-$, and TaF$_6^-$. Examples of the cations used in combination therewith include alkali metal ions such as Li$^+$, Na$^+$ and K$^+$, ammonium ions such as (CH$_3$)$_4$N$^+$, (C$_2$H$_5$)$_4$N$^+$, (C$_3$H$_7$)$_4$N$^+$, (CH$_3$)$_3$(C$_4$H$_9$)N$^+$, (C$_2$H$_5$)$_3$(C$_6$H$_{13}$)N$^+$, (C$_5$H$_{11}$)$_4$N$^+$, (CH$_2$)$_5$—N$^+$(CH$_3$)$_2$, (i—C$_5$H$_{11}$)$_4$N$^+$, (n—C$_6$H$_{13}$)$_4$N$^+$, (n—C$_8$H$_{17}$)$_4$N$^+$, (n—C$_4$H$_9$)$_3$N$^+$(CH$_2$—C$_6$H$_5$), (CH$_3$)$_2$.(C$_2$H$_5$).(C$_6$H$_5$)N$^+$, etc., phosphonium ions such as (C$_6$H$_5$)$_4$—P$^+$, (CH$_3$).(C$_6$H$_5$)$_3$P$^+$, (CH$_3$)$_2$.(C$_6$H$_5$)$_2$P$^+$, (CH$_3$)$_3$(C$_6$H$_5$)P$^+$, (C$_2$H$_5$).(C$_6$H$_5$)$_3$P$^+$, (C$_2$H$_5$)$_2$.(C$_6$H$_5$)$_2$P$^+$, H P$^+$(C$_6$H$_5$)$_3$, (C$_3$H$_7$).(C$_6$H$_5$)$_3$P$^+$, (CH$_2$=CHCH$_2$).(C$_6$H$_5$)$_3$P$^+$, (CH$_2$)$_3$=P$^+$(C$_6$H$_4$.C$_6$H$_5$)$_2$, (CH$_2$)$_n$P$^+$=(C$_6$H$_4$.C$_6$H$_4$.C$_6$H$_5$)$_2$ wherein n is 6, 10 or 12, and (CH$_3$.C$_6$H$_5$)$_m$P$^+$(C$_6$H$_5$)$_n$ wherein m+n is 4, n is 1, 2 or 3, and arsonium ions such as (CH$_3$).(C$_6$H$_5$)$_3$As$^+$, (C$_2$H$_5$).(C$_6$H$_5$)$_3$As$^+$, (CH$_3$.C$_6$H$_5$)As$^+$(C$_6$H$_5$)$_3$, (C$_6$H$_5$)$_4$As$^+$, (CH$_3$)$_2$.(CH.C$_6$H$_5$).(C$_6$H$_5$)$_3$As$^+$, (C$_6$H$_5$.C$_6$H$_4$).(C$_6$H$_5$)$_3$As$^+$, and (C$_6$H$_5$.CH$_2$).(C$_6$H$_5$)$_3$As$^+$. Any organic solvent can be used for dissolving at least one kind of the anions and cations above provided that it is inert for the electrodes and other materials, provided that electrolytic substance can be dissolved therein and an increased electric conductivity can be imparted thereto, and provided that it is not decomposed by the charging and discharging. Examples of organic solvents include acetonitrile, propylene carbonate, tetrahydrofuran, γ-butyrolactone, 1,2-dimethoxyethane, dioxane, dichloroethane, 1,2-dichloroethane, N,N-dimethylformamide, dimethyl sulfoxide, dimethyl sulfite, ethylene carbonate, 1,3-dioxolane, nitromethane, formamide, methyl formate, and 2-methyltetrahydrofuran, of which at least one is used.

Examples of the plastic material that serves as the negative or positive electrode, and that can be converted into a highly conductive material when it is doped with cations or anions, include polyacetylene, polyphenylene, poly(1,6-heptadiene), polypyrrole, polythenylene, poly(p-phenylenevinylene), poly(p-phenylene sulfide), poly(m-phenylene sulfide), and poly(p-phenylene oxide). These plastic materials can even be used for the positive electrode in the present invention. In this case, since the positive and negative electrodes are made of a plastic material, the cell can be constructed in a further reduced size, with a reduced weight.

Advantageously, the electrode comprises a collector and the electrode material which are formed as a unitary structure by directly synthesizing the plastic material onto a collector composed of a metal or carbon. According to this construction, the collector and the plastic electrode are formed as a unitary structure from the first, maintaining a closely adhered state and a small contact resistance. Therefore, there is no need to combine the collector and the electrode together, and the reduced resistance helps reduce the loss of electric energy.

In addition to electrically conductive plastic materials, the following materials can be used for forming the electrodes. For example, metal phthalocyanine complexes and polymers thereof such as iron phthalocyanine, copper phthalocyanine and cobalt phthalocyanine, metal porphyrin complexes which are cyclic complexes such as iron porphyrin, copper porphyrin, nickel porphyrin, cobalt porphyrin and magnesium porphyrin, and transition metal chalcogenides such as titanium dioxide, manganese dioxide, molybdenum trioxide, and vanadium oxides such as vanadium pentaoxide, tungsten trioxide, chromium oxide, titanium disulfide, tantalum disulfide, and niobium triselenide.

A separating film is normally placed between the positive and negative electrodes to prevent the short-circuiting that results when they are in contact with each other. The separating film must remain chemically stable for the positive and negative electrodes and for the electrolyte, and must be porous to permit the passage of the electrolyte, or to be impregnated with the electrolyte. The separating film can be made of polytetrafluoroethylene, polypropylene, polyethylene, polyvinyl chloride, or phenolic resin. Further, the film can be produced in the form of a nonwoven fabric, woven fabric or netting.

EXAMPLE 1

Figure 2:
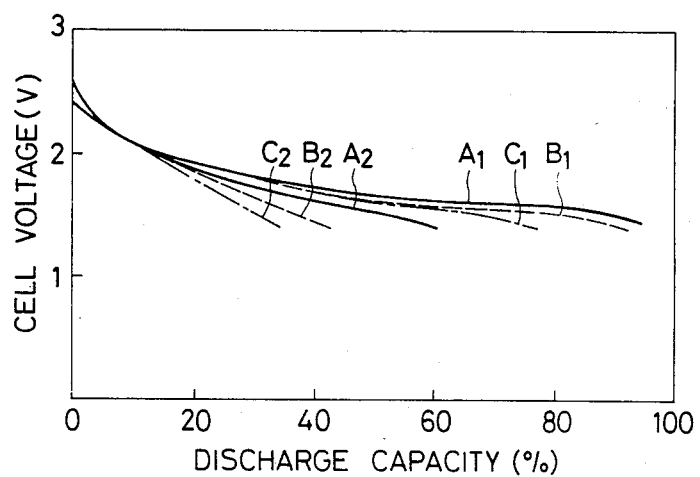
FIG. 2 is a graph showing the relationships between the discharge capacity and the cell voltage of plastic secondary cells.

A working example of the present invention will be described below in further detail in conjunction with the drawings. FIG. 1 is a cross-section of a cell according to the present invention, in which reference numeral 1 denotes a battery envelope holding the whole cell, 2 denotes a separating film separating the positive and negative electrodes, 3 denotes the positive electrode of the cell which is connected to the cathode terminal through a cathode collector lead 6, 4 denotes the negative electrode of the cell which is connected to the anode terminal through an anode collector lead 7, and 5 denotes an electrolyte which is held by the separating film 2, and which consists of an organic solvent and a salt that serves as the electrolyte. Reference numeral 8 denotes an insulator which prevents short-circuiting between the positive electrode 3 and the negative electrode 4. The positive electrode 3 was obtained by pressing, onto a titanium wire gauze, a mixture consisting of titanium disulfide that serves as the active material, acetylene black that serves as an electrically conductive material, and a fine powder of polytetrafluoroethylene (PTFE) that serves as a binder in a ratio of 10:1:1 by weight. The negative electrode was obtained by attaching a lead of platinum wire onto a 0.2 mm thick polyacetylene film, and then electrically charging the film at a current density of 1 mA/cm$^2$ at room temperature in an H-type glass cell filled with a tetrahydrofuran solution containing 0.5 M LiAsF$_6$, using a platinum plate with platinum black as the counter electrode, until Li$^+$ ions had been doped to 6% of the total weight. The cell shown in FIG. 1 was assembled from the thus obtained positive and negative electrodes, using a tetrahydrofuran solution of 0.5 M LiAsF$_6$ as the electrolyte, and using a nonwoven polypropylene fabric as a separating film. The cell was charged and discharged repetitively at a current density of 0.5 mA/cm$^2$ between a point at which the Li$^+$ ion content was 6% of the polyacetylene, and a point at which the Li$^+$ ion content was 2% of the polyacetylene. The lowest discharge voltage was 1.4 volts, and the highest charge voltage was 4.0 volts. The results were as shown in FIG. 2, in which curves A$_1$ and A$_2$ represent the discharge characteristics of the cell according to the present invention, and curves B$_1$ and B$_2$ represent the discharge characteristics of a conventional Li/TiS$_2$ cell, which differs from the cell of the present invention only in that the same amount of the metal lithium is used for the negative electrode. Curves C$_1$ and C$_2$ each correspond to the curves A$_1$ and A$_2$. That is, the positive and negative electrodes of this cell are the same as those of the present invention, but the electrolytic substance in the electrolyte is composed of 0.5 M LiClO$_4$. In FIG. 2 when curves A$_1$ and A$_2$ representing the performance of the cell of the present invention are compared with curves B$_1$, B$_2$, C$_1$ and C$_2$ representing the performances of conventional cells, it is obvious that the difference is small during the first discharge, but the cell of the present invention exhibits a discharge efficiency which is 15 to 20% better than that of conventional cells in the fiftieth discharge. In FIG. 2, the curves represent the following discharge characteristics: Curves A$_1$, B$_1$ and C$_1$: characteristics of the first discharge Curves A$_2$, B$_2$ and C$_2$: characteristics of the fiftieth discharge As will be obvious from the above description, the present invention provides a high-performance cell which exhibits an excellent charge/discharge efficiency when compared with conventional cells. This is presumably due to the fact that the metal lithium is not used for the negative electrode so that dendrites do not deposit, and that the selection of the electrolyte anions serving as the dopant helps stabilize the electrode, i.e., helps reduce self-discharge.

EXAMPLE 2

Figure 3:
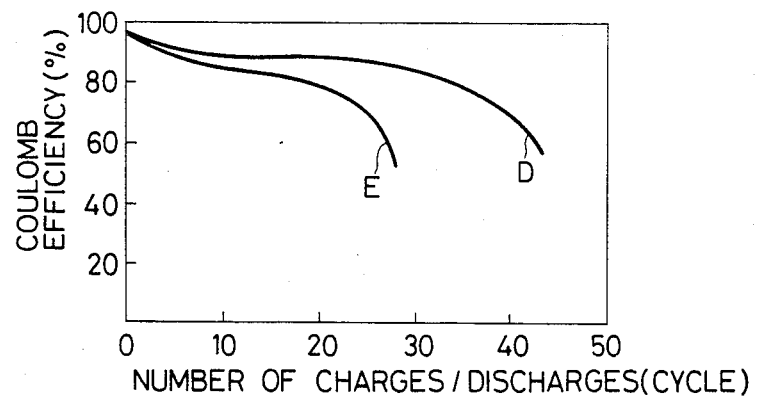
FIG. 3 is a graph showing the relationship between the number of charges/discharges and the coulombic efficiency of plastic secondary cells.

A cell was assembled using a polyacetylene film for both of the positive and negative electrodes. A tetrahydrofuran solution of 0.5 M LiBF$_4$ was used as the electrolyte, and a nonwoven polypropylene fabric was used as the separating film to assemble a cell of the construction shown in FIG. 1. The cell was charged and discharged repetitively at a current density of 0.5 mA/cm$^2$ between a doping ratio of 6% and a doping ratio of 2% with respect to the polyacetylene. The change in the coulomb efficiency was as shown by the curve D in FIG. 3. For the purposes of comparison, the performance of a cell constructed in the same manner as the above cell but in which a tetrahydrofuran solution of 0.5 M LiClO$_4$ was used as the electrolyte, is shown by the curve E. As is obvious from FIG. 3, the cell D of the present invention using LiBF$_4$ as the electrolyte exhibits a lifetime which is approx. 50% longer than that of the conventional cell E. This reflects the fact that the cell of the invention doped with an electrolyte containing non-oxyacidic anions permits the polyacetylene films to be less degraded by oxidation.

EXAMPLE 3

The present invention was applied to cells in which phthalocyanine complexes were used as the active material for the positive plates. Three kinds of active materials were used for the positive plates: iron phthalocyanine ($C_{32}H_{16}FeN_8$), copper phthalocyanine ($C_{32}H_{16}CuN_8$), and cobalt phthalocyanine ($C_{36}H_{18}CoN_8$). 10:1:1 (weight ratio) mixtures of each active material, fine acetylene black powder acting as a conductive agent and fine polytetrafluoroethylene (PTFE) powder acting as a binder were pressed onto expanded titanium metal to form positive plates. The negative plates were formed by attaching platinum leads to 0.2 mm-thick polyacetylene film. In the same way as in Example 1, the negative plates were doped with Li$^+$ in a dosage of up to 6% of the total quantity of polyacetylene. Cells as shown in FIG. 1 were assembled using the positive and negative plates thus produced, 0.5 M of a tetrahydrofuran solution of LiAsF$_6$ was used as electrolyte, and non-woven polypropylene fabric as separator. The cells were repeatedly charged and discharged at room temperature and a current density of 1 mA/cm$^2$, so that the Li$^+$ content of the polyacetylene varied between 2% and 6%. The final discharge voltages during that time are shown in Table 1.

TABLE 1

Performance of Secondary Cells Using Phthalocyanine Complexes

| Active material of positive plate | Final discharge voltage (V) | |
| --- | --- | --- |
| | 1st cycle | 50th cycle |
| Iron phthalocyanine | 1.8 | 1.4 |
| Copper phthalocyanine | 1.6 | 1.3 |
| Cobalt phthalocyanine | 1.5 | 1.1 |

As can be seen clearly from Table 1, all the cells exhibited final discharge voltages of more than 1 V, even in the 50th discharge cycle. It was thus confirmed that all the secondary cells using phtalocyanine complexes as the active material of the positive plates thereof had excellent charge and discharge characteristics.

EXAMPLE 4

The present invention was applied to cells in which porphyrin complexes were used as the active material of the positive plates thereof. The active materials used for the positive plates were iron porphyrin ($C_{20}H_{12}FeN_4$), nickel porphyrin ($C_{20}H_{12}NiN_4$), and copper porphyrin ($C_{20}H_{12}CuN_4$). The positive plates were each produced from these active materials in the same way as in Example 3, and cells were assembled. Each cell was repeatedly charged and discharged at room temperature and a current density of 0.5 mA/cm$^2$, so that the Li$^+$ content of the polyacetylene varied between 2% and 6%. The performance of each cell during that time was compared according to the final discharge voltages in the first and 50th cycles, and the results are shown in Table 2 below.

TABLE 2

Performance of Secondary Cells Using Porphyrin Complexes

| Active material of positive plate | Final discharge voltage (V) | |
| --- | --- | --- |
| | 1st cycle | 50th cycle |
| Iron porphyrin | 1.6 | 1.1 |
| Nickel porphyrin | 1.3 | 1.0 |
| Copper porphyrin | 1.5 | 1.3 |

Each of the cells of this example exhibited a final discharge voltage of at least 1 V in the 50th cycle, and the voltage drop from the first cycle was less than 0.5 V. Thus, it was determined that each cell was a secondary cell with an excellent performance.

EXAMPLE 5

Figure 4:
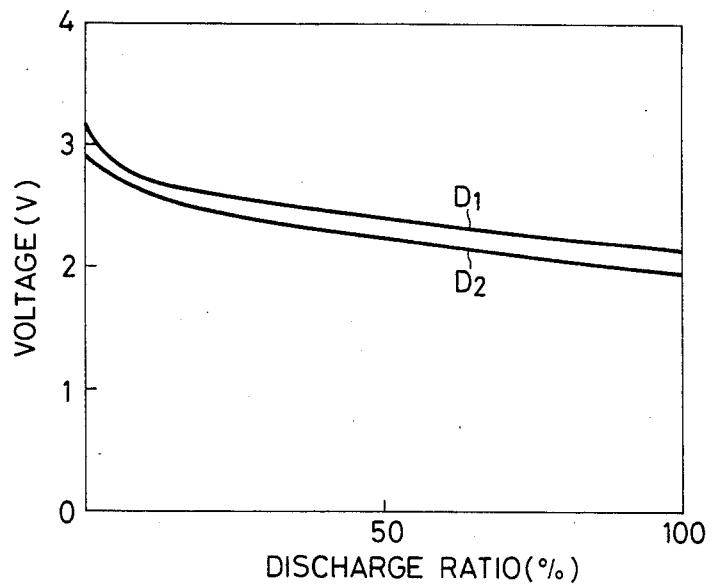
FIGS. 4 and 5 are graphs showing the relationships between voltages (V) and discharge ratios (%) of the cells of the present invention.

The present invention was applied to secondary cells in which chromium oxide ($Cr_3O_8$) was used as the active material of the positive plates. A 7:2:1 mixture (weight ratio) of $Cr_3O_8$, fine synthetic graphite powder acting as a conductive agent, and fine polytetrafluoroethylene (PTFE) powder acting as a binder was pressed onto expanded titanium metal to form positive plates. The negative plates, their pretreatment, and the assembly of the cells were the same as those in the previous examples. Each of cells thus assembled was repeatedly charged and discharged at room temperature and a current density of 0.5 mA/cm$^2$, so that the Li$^+$ content of the polyacetylene varied between 1% and 6%. The discharge characteristics during that time are shown in FIG. 4. In the graph, symbols $F_1$ and $F_2$ represent the discharge characteristics in the first and 50th cycles, respectively. The graph shows that all the cells were excellent because they hardly exhibited any change in discharge characteristics even after the charges and discharges were repeated 50 times.

EXAMPLE 6

Figure 5:
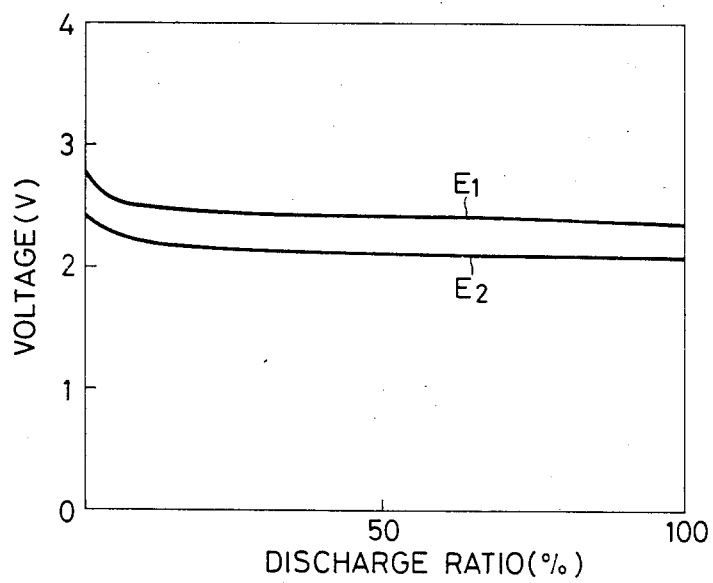

The present invention was applied to secondary cells in which niobium triselenide (NbSe$_3$) was used as the active material of the positive plates. An 8:1 mixture (weight ratio) of niobium triselenide and fine polytetrafluoroethylene powder acting as a binder was pressed onto expanded titanium metal to form positive plates. The negative plates were of polyacetylene film of an average thickness of 0.2 mm which were precipitated by polymerization onto platinum netting of 80 mesh. In these negative plates of polyacetylene film, the platinum netting acted as a plate support and also as a plate current collector. In the same way as in the previous examples, the negative plates were doped with Li$^+$ in a dosage of up to 6% of the weight of the polyacetylene. Cells as shown in FIG. 1 was assembled using the positive and negative plates thus produced, a 1 M γ-butyrolactone solution of LiBF$_4$ acting as electrolyte and non-woven polypropylene fabric acting as separator. Each cell was repeatedly charged and discharged at room temperature and a current density of 0.2 mA/cm$^2$ so that the Li$^+$ content of the polyacetylene varied between 2% and 6%. The discharge characteristics during this time are shown in FIG. 5. In the graph, symbols $G_1$ and $G_2$ represent the discharge characteristics in the first and 50th cycles, respectively. The change in the discharge characteristics was small even after the charges and discharges were repeated 50 times, this means that each cell had a uniform and excellent performance.

What is claimed is:

1. A secondary battery comprising an anode, a cathode, and a liquidous electrolyte layer interposed between the anode and the cathode, said electrolyte containing a dopant consisting of anions and cations, wherein said anode inlcudes an anode active material of an organic polymer which is capable of being reversively converted into a highly conductive substance by doping cations thereinto, said cathode includes a cathode active material capable of forming an intercalation compound with the cations in said electrolyte and in said anode and selected from the group consisting of metal phthalocyanine complexes, metal porphyrin complexes, and transition metal chalocogenide compounds, and the anions in said electrolyte are non-oxyacidic polyatomic anions to thereby reduce degradation of the organic polymer by oxidation.

2. A secondary battery according to claim 1, wherein the anions contained in the electrolyte are a member selected from the group consisting of $BF_4^-$, $AlCl_4^-$, $AsF_6^-$, $PF_6^-$, $SCN^-$, $SbF_6^-$, $NbF_6^-$ and $TaF_6^-$.

3. A secondary battery according to claim 1, wherein the cations contained in the electrolyte are a member selected from the group consisting of alkali metal ions, ammonium ions, phosphonium ions and arsonium ions.

4. A secondary battery according to claim 1, wherein the cathode active material is a member selected from the group consisting of metal phthalocyanine complexes.

5. A secondary battery according to claim 1, wherein said cathode active material is a member selected from the group consisting of metal phthalocyanine complexes of iron, copper, cobalt and mixtures thereof.

6. A secondary battery according to claim 1, wherein said cathode active material is a member selected from the group consisting of metal porphyrin complexes of iron, copper, nickel, magnesium and mixtures thereof.

7. A secondary battery according to claim 1, wherein said cathode active material is constituted by transition metal chalcogenide compounds selected from the group consisting of titanium disulfide, chromium oxide, niobium triselenide, and a mixture thereof.

8. A secondary battery according to claim 1, wherein the electrolyte, and anode and cathode, are air-tightly sealed in an envelope.

9. A secondary battery comprising an anode and a cathode, at least one of said anode and cathode including, respectively, an anode active material and a cathode active material of an organic polymer reversibly converted to a highly conductive substance through doping of cations and anions, respectively, and an electrolyte including anions and cations, wherein the anions in said electrolyte are non-oxyacidic anions to thereby reduce degradation of the organic polymer by oxidation.

10. A secondary battery according to claim 9, wherein said non-oxyacidic anions are non-oxyacidic polyatomic anions.

11. A secondary battery according to claim 10, wherein said anode and said cathode include, respectively, said anode active material and said cathode active material.

12. A secondary battery according to claim 9, wherein said non-oxyacidic anions are selected from the group consisting of $BF_4^-$, $AlCl_4^-$, $AsF_6^-$, $PF_6^-$, $SCN^-$, $SbF_6^-$, $NbF_6^-$ and $TaF_6^-$.

13. A secondary battery according to claim 9, wherein said organic polymer is selected from the group consisting of polyacetylene, polyphenylene, poly(1,6-heptadiene), polypyrrole, polythenylene, poly(p-phenylenevinylene), poly(p-phenylene sulfide), poly(m-phenylene sulfide), and poly(p-phenylene oxide).

14. A secondary battery according to claim 9, wherein said cathode includes said cathode active material of an organic polymer reversibly converted to a highly conductive substance through doping of anions.

* * * * *